United States Patent
Umapathy et al.

(10) Patent No.: US 11,895,073 B2
(45) Date of Patent: Feb. 6, 2024

(54) SYSTEMS AND METHODS FOR TRIGGERING REDISPLAY OF A POSTPONED MESSAGE

(71) Applicant: GOOGLE LLC, Mountain View, CA (US)

(72) Inventors: Vijay Umapathy, Sunnyvale, CA (US); Ryan James Fioravanti, Kitchener (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/896,235

(22) Filed: Aug. 26, 2022

(65) Prior Publication Data

US 2022/0407832 A1    Dec. 22, 2022

Related U.S. Application Data

(63) Continuation of application No. 17/392,520, filed on Aug. 3, 2021, now Pat. No. 11,463,396, which is a continuation of application No. 16/860,876, filed on Apr. 28, 2020, now Pat. No. 11,108,723, which is a continuation of application No. 14/473,550, filed on Aug. 29, 2014, now Pat. No. 10,680,988.

(51) Int. Cl.
| | |
|---|---|
| *G06F 15/16* | (2006.01) |
| *H04L 51/224* | (2022.01) |
| *H04L 51/226* | (2022.01) |
| *H04L 51/222* | (2022.01) |

(52) U.S. Cl.
CPC .......... *H04L 51/224* (2022.05); *H04L 51/226* (2022.05); *H04L 51/222* (2022.05)

(58) Field of Classification Search
CPC ......... H04L 51/24; H04L 51/26; H04L 51/20; H04L 51/212; H04L 51/214; H04L 51/222; H04L 51/224; H04L 51/226; H04L 51/52; H04L 51/58; H04L 51/00; H04L 51/56; H04N 21/42209; G06F 2211/006
USPC ....................................................... 709/206
See application file for complete search history.

(56) References Cited

U.S. PATENT DOCUMENTS

| | | |
|---|---|---|
| 7,155,241 B2 | 12/2006 | Helferich |
| 7,213,210 B2 | 5/2007 | Reysa |
| 7,334,000 B2 | 2/2008 | Chhatrapati et al. |

(Continued)

FOREIGN PATENT DOCUMENTS

| | | | | |
|---|---|---|---|---|
| EP | 2224714 A1 | 9/2010 | | |
| WO | WO-2015149025 A1 * | 10/2015 | ........... | G06F 3/0482 |

*Primary Examiner* — Anthony Mejia
(74) *Attorney, Agent, or Firm* — Botos Churchill IP Law

(57) ABSTRACT

A method of postponing an electronic message is performed at a computing device having one or more processors and memory. The memory stores one or more programs configured for execution by the one or more processors. The device displays a first electronic message for a user of the computing device and receives user input to postpone the first electronic message. In response to the user input, the device displays a plurality of postponement locations in a user interface window and receives user selection of a postponement location from the displayed plurality of postponement locations. The device then inhibits display of the first electronic message at the computing device. When it is subsequently determined that the computing device is at the first postponement location, the device redisplays the first electronic message.

20 Claims, 9 Drawing Sheets

(56) References Cited

U.S. PATENT DOCUMENTS

| | | | |
|---|---|---|---|
| 7,369,647 B2* | 5/2008 | Gao | H04M 3/537 |
| | | | 709/206 |
| 7,583,972 B2 | 9/2009 | Clipsham | |
| 7,774,407 B2 | 8/2010 | Daly et al. | |
| 8,155,624 B2 | 4/2012 | Khoury | |
| 8,229,413 B2 | 7/2012 | Brown et al. | |
| 8,312,096 B2* | 11/2012 | Cohen | H04L 51/224 |
| | | | 455/418 |
| 8,315,607 B2 | 11/2012 | Chen et al. | |
| 8,345,600 B2 | 1/2013 | Chang | |
| 8,533,274 B2 | 9/2013 | Buchheit et al. | |
| 8,601,067 B2 | 12/2013 | Gartside et al. | |
| 8,868,053 B2 | 10/2014 | Thompson | |
| 9,338,026 B2 | 5/2016 | Bandini et al. | |
| 10,088,890 B1* | 10/2018 | Ehrhardt | H04L 67/141 |
| 2002/0067308 A1 | 6/2002 | Robertson | |
| 2002/0169840 A1* | 11/2002 | Sheldon | H04L 51/212 |
| | | | 709/206 |
| 2003/0046421 A1 | 3/2003 | Horvitz et al. | |
| 2003/0105827 A1 | 6/2003 | Tan et al. | |
| 2003/0135558 A1* | 7/2003 | Bellotti | G06Q 10/107 |
| | | | 709/206 |
| 2003/0135569 A1 | 7/2003 | Khakoo et al. | |
| 2004/0103160 A1 | 5/2004 | Sheldon et al. | |
| 2004/0210587 A1 | 10/2004 | Reysa | |
| 2005/0048998 A1 | 3/2005 | Zhu | |
| 2005/0081059 A1* | 4/2005 | Bandini | H04L 63/0245 |
| | | | 726/4 |
| 2006/0271635 A1* | 11/2006 | Raghav | G06Q 10/107 |
| | | | 709/204 |
| 2008/0075257 A1 | 3/2008 | Nguyen et al. | |
| 2008/0133336 A1 | 6/2008 | Altman et al. | |
| 2008/0186196 A1 | 8/2008 | Lessing | |
| 2008/0268895 A1* | 10/2008 | Foxenland | H04W 4/029 |
| | | | 455/550.1 |
| 2009/0157708 A1* | 6/2009 | Bandini | H04L 63/0245 |
| 2009/0209243 A1 | 8/2009 | Brown et al. | |
| 2009/0228558 A1* | 9/2009 | Brenner | G06Q 10/107 |
| | | | 709/206 |
| 2009/0254624 A1* | 10/2009 | Baudin | G06Q 10/107 |
| | | | 707/999.01 |
| 2009/0264116 A1 | 10/2009 | Thompson | |
| 2010/0057879 A1* | 3/2010 | Buchheit | G06Q 10/107 |
| | | | 709/206 |
| 2010/0064017 A1 | 3/2010 | Buchheit et al. | |
| 2010/0222042 A1 | 9/2010 | Bosan et al. | |
| 2010/0255817 A1 | 10/2010 | Chen et al. | |
| 2010/0273447 A1 | 10/2010 | Mann et al. | |
| 2010/0299394 A1* | 11/2010 | Jania | G06Q 10/107 |
| | | | 709/206 |
| 2011/0066690 A1* | 3/2011 | Ellanti | G06Q 10/107 |
| | | | 709/206 |
| 2011/0072374 A1* | 3/2011 | Kunz | G06Q 30/0276 |
| | | | 715/764 |
| 2011/0099233 A1* | 4/2011 | Calder | G06F 9/546 |
| | | | 709/206 |
| 2011/0119258 A1 | 5/2011 | Forutanpour et al. | |
| 2011/0202956 A1* | 8/2011 | Connelly | H04N 21/43637 |
| | | | 725/38 |
| 2012/0094698 A1 | 4/2012 | Casto | |
| 2012/0198001 A1 | 8/2012 | Deluca | |
| 2013/0091223 A1* | 4/2013 | DeLuca | G06Q 10/10 |
| | | | 709/206 |
| 2013/0095865 A1 | 4/2013 | Roets | |
| 2013/0115927 A1 | 5/2013 | Gruber | |
| 2013/0262605 A1* | 10/2013 | Buchheit | G06Q 10/107 |
| | | | 709/206 |
| 2014/0047053 A1 | 2/2014 | Chawla | |
| 2014/0057606 A1 | 2/2014 | Kunjithapatham et al. | |
| 2014/0082521 A1* | 3/2014 | Carolan | H04L 51/00 |
| | | | 715/752 |
| 2014/0089417 A1* | 3/2014 | Van Os | H04L 51/00 |
| | | | 709/206 |
| 2014/0156597 A1 | 6/2014 | Hakami et al. | |
| 2014/0223347 A1* | 8/2014 | Seo | G06F 3/0481 |
| | | | 715/769 |
| 2014/0229555 A1 | 8/2014 | Deluca et al. | |
| 2014/0297762 A1* | 10/2014 | Chikkanna | H04L 51/222 |
| | | | 709/206 |
| 2014/0351411 A1* | 11/2014 | Woods | H04W 4/021 |
| | | | 709/224 |
| 2015/0006648 A1 | 1/2015 | Cao | |
| 2015/0080029 A1* | 3/2015 | Porter | H04W 4/021 |
| | | | 455/456.3 |
| 2015/0106741 A1* | 4/2015 | Friend | G06Q 10/107 |
| | | | 715/752 |
| 2015/0143258 A1* | 5/2015 | Carolan | H04L 51/18 |
| | | | 715/752 |
| 2015/0195232 A1 | 7/2015 | Haugen et al. | |
| 2015/0207769 A1* | 7/2015 | Lu | H04L 51/18 |
| | | | 709/206 |
| 2015/0281155 A1* | 10/2015 | Cue | G06F 3/04883 |
| | | | 715/752 |
| 2015/0281889 A1* | 10/2015 | Menendez | H04W 4/021 |
| | | | 455/456.1 |
| 2015/0350146 A1* | 12/2015 | Cary | H04L 67/52 |
| | | | 709/206 |
| 2015/0350147 A1* | 12/2015 | Shepherd | H04L 51/10 |
| | | | 715/752 |
| 2015/0381533 A1* | 12/2015 | Klemm | H04L 51/02 |
| | | | 709/206 |
| 2016/0102988 A1* | 4/2016 | Kalai | G01C 21/3881 |
| | | | 701/428 |
| 2016/0239354 A1* | 8/2016 | Shen | H04M 1/72451 |
| 2018/0336530 A1* | 11/2018 | Johnson | G06Q 10/1093 |
| 2020/0028815 A1* | 1/2020 | He | H04L 51/52 |
| 2020/0336452 A1* | 10/2020 | Gorelik | G06Q 10/107 |

\* cited by examiner

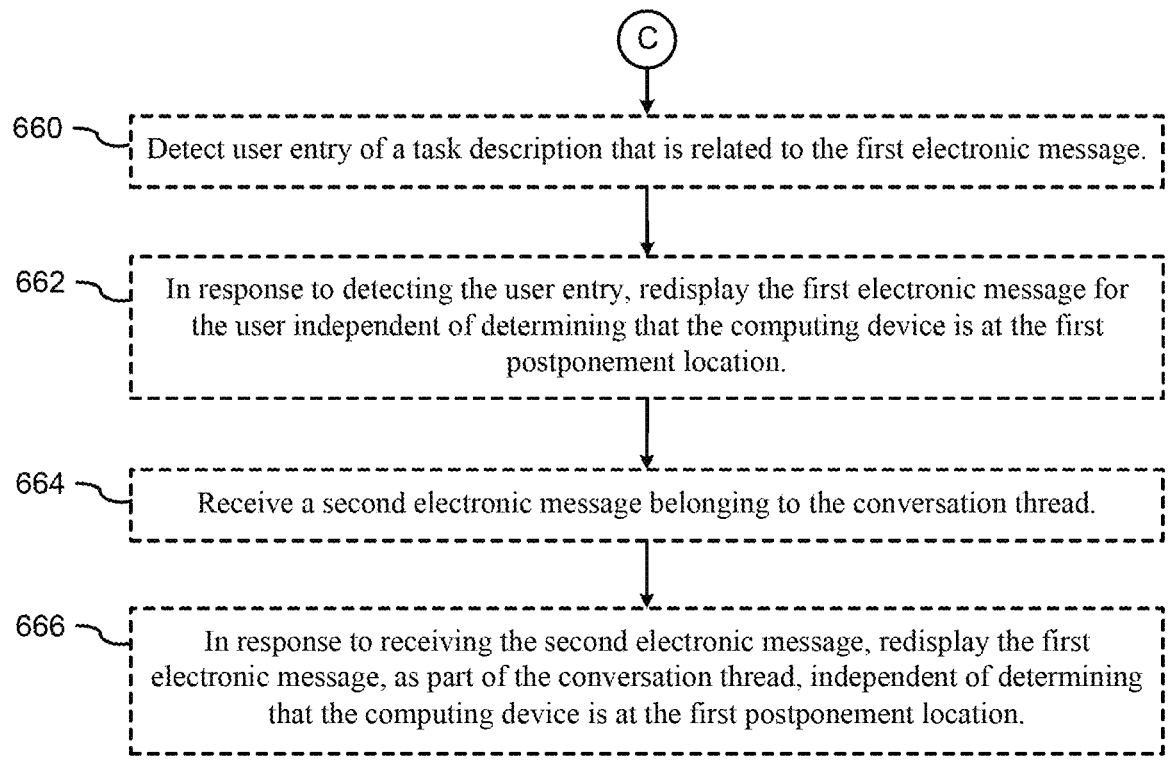

SYSTEMS AND METHODS FOR TRIGGERING REDISPLAY OF A POSTPONED MESSAGE

CROSS-REFERENCE TO RELATED APPLICATIONS

This application is a continuation of U.S. patent application Ser. No. 17/392,520, filed Aug. 3, 2021, which is a continuation of U.S. patent application Ser. No. 16/860,876, filed Apr. 28, 2020, which is a continuation of U.S. patent application Ser. No. 14/473,550, filed Aug. 29, 2014, now issued as U.S. Pat. No. 10,680,988, the disclosures of which are incorporated herein by reference. This application is related to U.S. patent application Ser. No. 14/473,536, filed Aug. 29, 2014, and to U.S. patent application Ser. No. 16/834,918, filed Mar. 30, 2020, each entitled "Systems and Methods for Temporarily Postponing Messages", the disclosures of which are incorporated herein by reference.

TECHNICAL FIELD

The disclosure relates generally to electronic messaging applications, and more specifically to postponing electronic messages.

BACKGROUND

Electronic messages may be received at any time, regardless of convenience. In some cases it is useful to "snooze" a message until a later time if the message cannot be handled right away. Postponing messages can be an effective way to keep a user's message list (e.g., inbox) smaller or better organized. However, the burden of selecting and specifying a snooze time can reduce the efficiency or prompt a user not to use a snooze feature at all. In addition, time-based snooze options are not always appropriate.

SUMMARY

Disclosed implementations address the above deficiencies and other problems associated with postponing electronic messages. When a user decides to postpone a message, the messaging application provides an option to postpone the message until the user is at a designated location. For example, the user may designate a "home" location or a "work" location, and may postpone the message until the user arrives at home or arrives at work. A user can also designate other locations, such as the locations for local service providers that the user has a relationship with (e.g., a "dentist" location for the user's dentist).

When the user arrives at the designated location, the postponed message is redisplayed or re-presented for the user. In some implementations, the postponed message (or the conversation or cluster that contains the message) is filtered or hidden from view during the postponement period, and bringing back the message comprises removing the filter and refreshing the display. In some implementations, the postponed message is removed from the user's message list (e.g., inbox) during the postponement period, and is reinserted into the message list after the postponement period. In some of these implementations, redisplaying the message operates as a reoccurrence of the postponed message. In some implementations, a reoccurrence of a postponed message behaves like a new message, and is thus presented at the top of the user's message list.

In accordance with some implementations, a method of postponing an electronic message is performed at a computing device having one or more processors and memory. The memory stores one or more programs configured for execution by the one or more processors. The device displays a first electronic message for a user of the computing device and receives user input to postpone the first electronic message. In response to the user input, the device displays a plurality of postponement locations in a user interface window and receives user selection of a postponement location from the displayed plurality of postponement locations. The device then inhibits display of the first electronic message at the computing device. When it is subsequently determined that the computing device is at the first postponement location, the device redisplays the first electronic message. In some implementations, the first electronic message is redisplayed at a top position in an email inbox. In some implementations, the first electronic message is redisplayed at a position in an email inbox where the first electronic message was originally displayed.

In some implementations, the first electronic message is an email message. In some implementations, the first electronic message is an instant message.

In some instances, the first postponement location corresponds to a single physical location. In other instances, the first postponement location corresponds to a plurality of distinct physical locations.

In some implementations, the user interface window includes a list of named locations, including the first postponement location, and the first postponement location was previously assigned a name by the user while entering a task reminder.

In some instances, a user assigns a name or label to a location while postponing a message to that location. Later the user can postpone other messages to the same location just by selecting the assigned label. In some implementations, displaying the first plurality of postponement locations in the user interface window includes displaying a mapping user interface window, and receiving user selection of the first postponement location comprises receiving user selection of a location in the mapping user interface window. In some implementations, after receiving user selection of the location in the mapping user interface window, the device receives user input of a first name associated with the location and stores the user-provided association of the first name with the location. In some implementations, the device displays a second electronic message for the user of the computing device and receives user input to postpone the second electronic message. In response to the user input, the device displays a second plurality of postponement locations in the user interface window, where the second plurality of postponement locations includes the first name for the first postponement location. In some implementations, the device receives user selection of the first name for the first postponement location and inhibits display of the second electronic message at the computing device. When the computing device is subsequently at the first postponement location, the device redisplays the second electronic message.

In some implementations, determining that the computing device is at the first postponement location is based on determining that the computing device has crossed a geofence for the first postponement location. In some implementations, determining that the computing device is at the first postponement location is based on determining that the computing device is within a threshold distance of the first postponement location.

In accordance with some implementations, an electronic message that has been postponed to a location may be redisplayed early based on various conditions. In some implementations, the device detects the occurrence of an event related to the first electronic message (e.g., a related news event) and in response to detecting the event, the device redisplays the first electronic message without determining that the computing device is at the first postponement location. In some implementations, the device detects user entry of a task description that is related to the first electronic message and in response to detecting the user entry, the device redisplays the first electronic message for the user without determining that the computing device is at the first postponement location. In some implementations, the first electronic message is part of a conversation thread, and the device receives a second electronic message belonging to the conversation thread. In response to receiving the second electronic message, the device redisplays the first electronic message, as part of the conversation thread, without determining that the computing device is at the first postponement location.

Thus methods and systems are provided that enable a user to postpone an electronic message until the user's computing device is at a designated location.

BRIEF DESCRIPTION OF THE DRAWINGS

For a better understanding of the aforementioned implementations of the invention as well as additional implementations thereof, reference should be made to the Description of Implementations below, in conjunction with the following drawings in which like reference numerals refer to corresponding parts throughout the figures.

FIGS. 6A-6D provide a flowchart of a process, performed at a client computing device, for postponing electronic messages according to some implementations.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Figure 1:
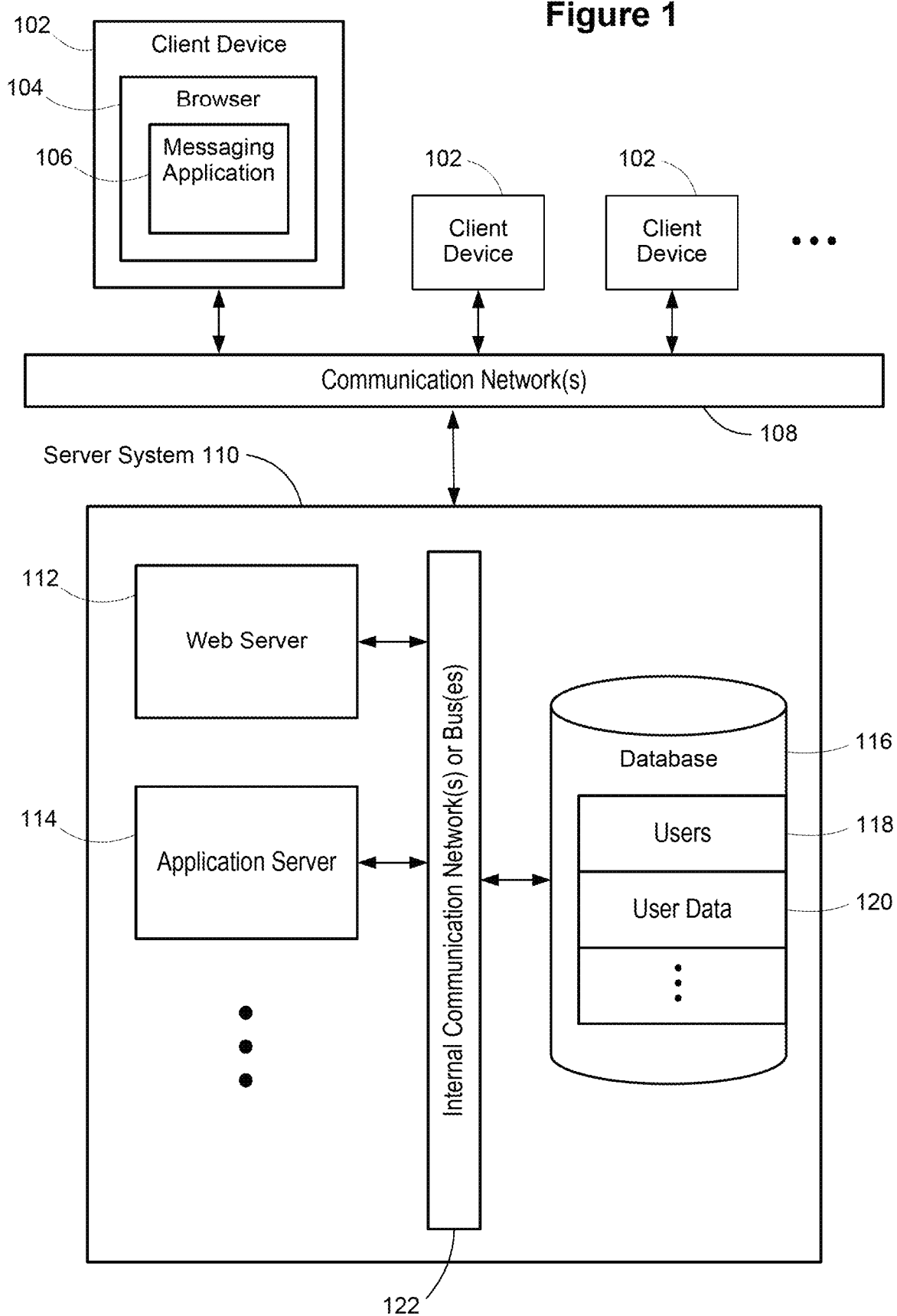
FIG. 1 illustrates a context in which some implementations operate.

FIG. 1 is a block diagram that illustrates the major components of some implementations. The various client devices 102 (also identified herein as computing devices) and servers 300 in a server system 110 communicate over one or more networks 108 (such as the Internet). A client device 102 may be a smart phone, a tablet computer, a laptop computer, a desktop computer, or other computing device that has access to a communication network 108 and can run a messaging application 106. In some implementations, the messaging application runs within a web browser 104.

In some implementations, the server system 110 consists of a single server 300. In some implementations, the server system 110 includes a plurality of servers 300. In some implementations, the servers 300 are connected by an internal communication network or bus 122. The server system 110 includes one or more web servers 112, which receive requests from users (e.g., from client devices 102) and return appropriate information, resources, links, and so on. In some implementations, the server system 110 includes one or more application servers 114, which provide various applications, such as a messaging application 106. The server system 110 typically includes one or more databases 116, which store information such as web pages, a user list 118, and various user information 120 (e.g., user names and encrypted passwords, user preferences, and so on).

Figure 2:
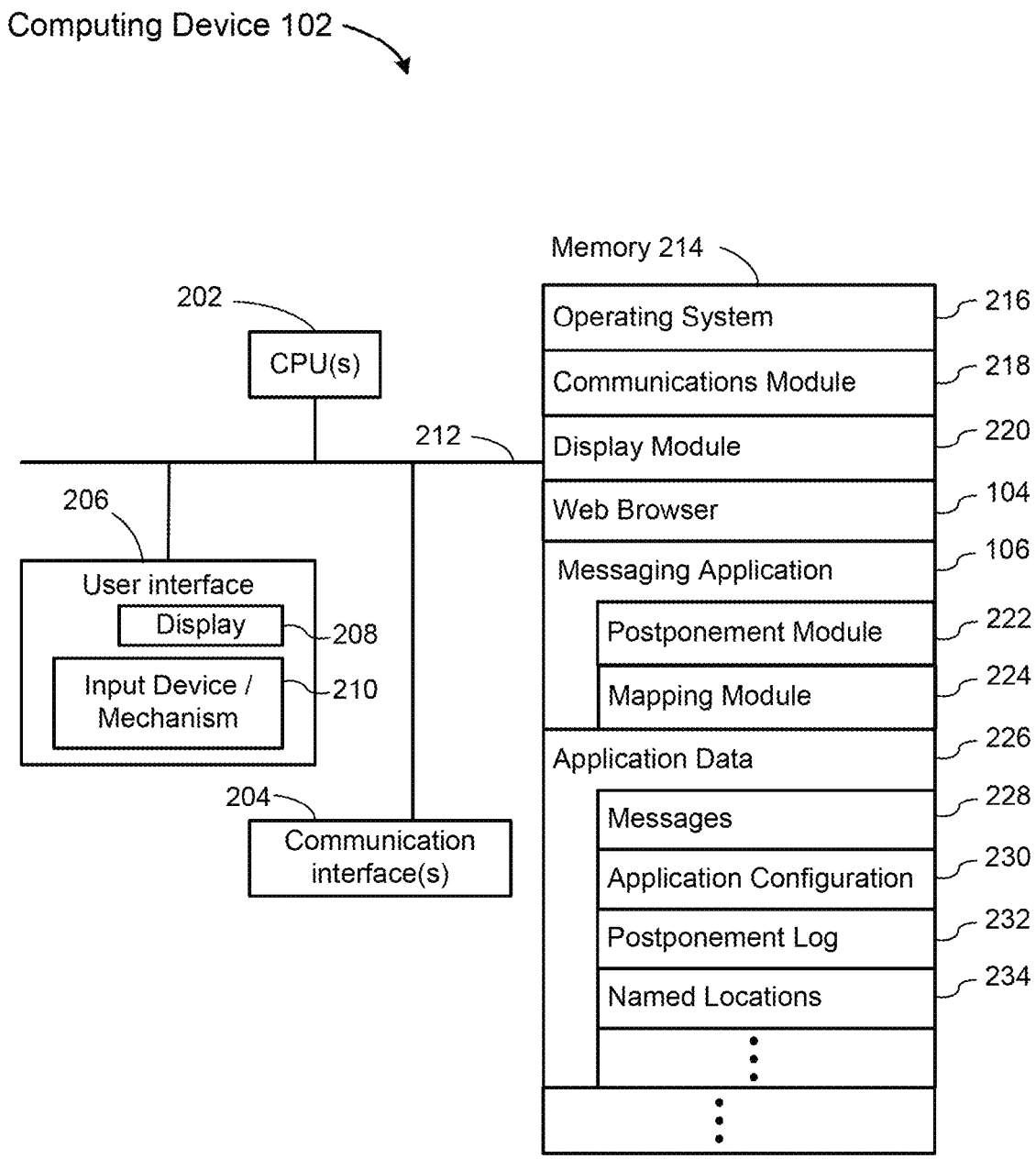
FIG. 2 is a block diagram of a client computing device according to some implementations.

FIG. 2 is a block diagram illustrating a client device 102 that a user uses to access a messaging application 106. A client device is also referred to as a computing device, which may be a tablet computer, a laptop computer, a smart phone, a desktop computer, a PDA, or other computing device than can run a messaging application 106 and has access to a communication network 108. A client device 102 typically includes one or more processing units (CPUs) 202 for executing modules, programs, or instructions stored in memory 214 and thereby performing processing operations; one or more network or other communications interfaces 204; memory 214; and one or more communication buses 212 for interconnecting these components. The communication buses 212 may include circuitry (sometimes called a chipset) that interconnects and controls communications between system components. A client device 102 includes a user interface 206 comprising a display device 208 and one or more input devices or mechanisms 210. In some implementations, the input device/mechanism includes a keyboard and a mouse; in some implementations, the input device/mechanism includes a "soft" keyboard, which is displayed as needed on the display device 208, enabling a user to "press keys" that appear on the display 208.

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the client device 102 to other computers and devices via the one or more communication network interfaces 204 (wired or wireless) and one or more communication networks 108, such as the Internet, other wide area networks, local area networks, metropolitan area networks, and so on;
- a display module 220, which receives input from the one or more input devices 210, and generates user interface elements for display on the display device 208;

a web browser 104, which enables a user to communicate over a network 108 (such as the Internet) with remote computers or devices;

a messaging application 106, which enables the user to send and receive electronic messages. In some implementations, the messaging application is an email application. In some implementations, the messaging application is an instant messaging application. In some implementations, the messaging application 106 runs within the web browser 104 as illustrated in FIG. 1. In some implementations, the messaging application 106 runs independently of a web browser 104 (e.g., a desktop application). The messaging application includes a postponement module 222, which identifies a set of postponement options when a user decides to postpone a message. This is illustrated below in FIG. 4. In some implementations, the messaging application 106 or the postponement module 222 includes a mapping module 224. The mapping module provides a mapping interface when a user chooses to postpone a message to a location (i.e., postpone displaying the message until the computing device 102 is at the designated location). This is illustrated below in FIG. 5;

application data 226, which is used by the messaging application 106. The application data includes messages 228 (e.g., email messages or instant messages). The application data 226 may include configuration data 230, such as user preferences, user history, or the state of configuration options. In some implementations, the application data includes a postponement log 232, which stores information about each postponement selected by the user (e.g., date, time, context, option selected, and parameters associated with the user selection). In some implementations, the application data 226 includes a set of named locations 234. A named location is a location (e.g., an address) for which the user has assigned a name or label. For example, the user may assign the name "home" to the user's home location, or assign the name "library" to the location of the user's local library. In some implementations, the application data 226 is stored in a relational database, a CSV file, or an XML file.

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 may store a subset of the modules and data structures identified above. Furthermore, the memory 214 may store additional modules or data structures not described above.

Although FIG. 2 shows a client device 102, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
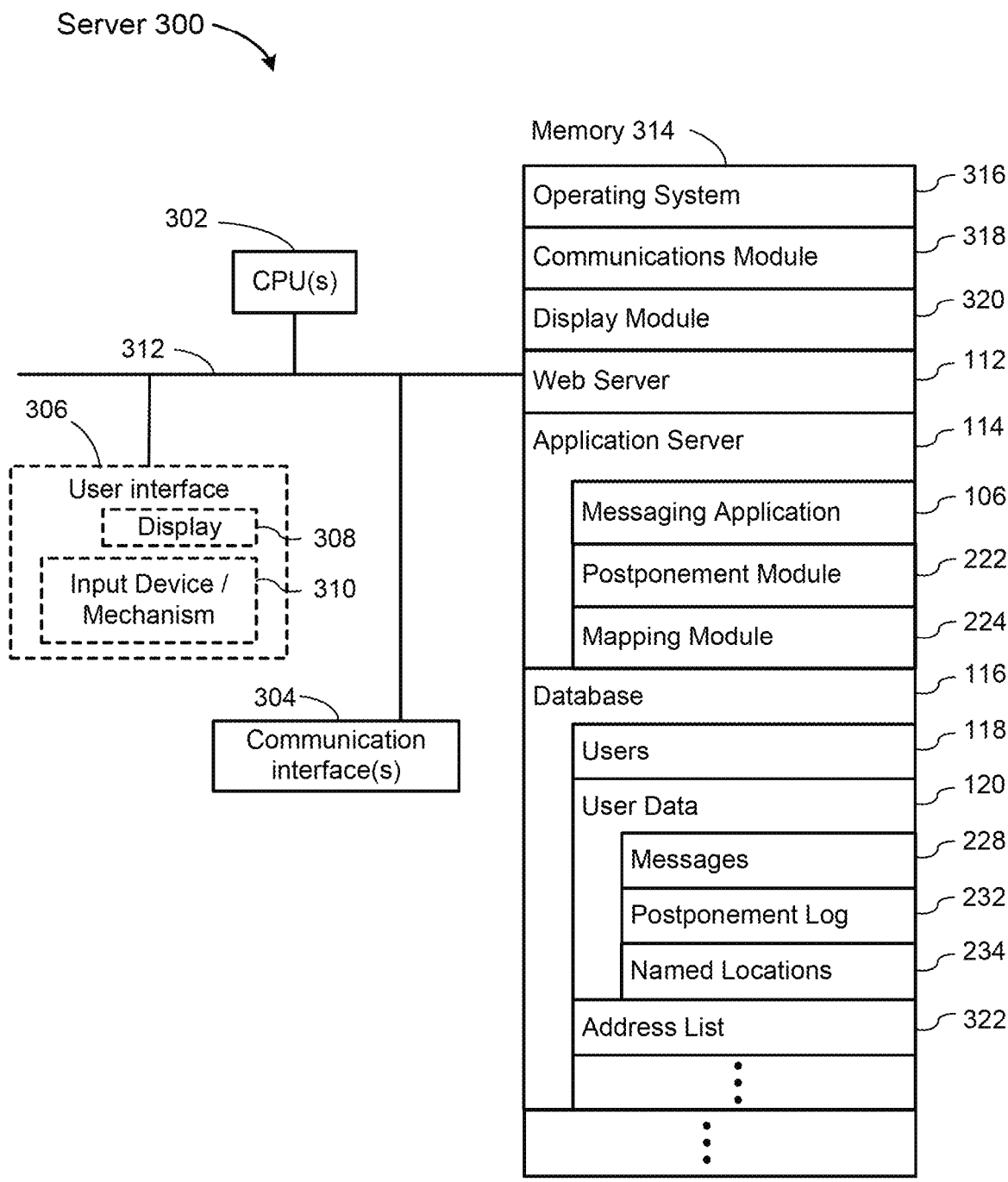
FIG. 3 is a block diagram of a server according to some implementations.

FIG. 3 is a block diagram illustrating a server 300 that may be used in a server system 110. A typical server system includes many individual servers 300, which may be tens, hundreds, or thousands. A server 300 typically includes one or more processing units (CPUs) 302 for executing modules, programs, or instructions stored in the memory 314 and thereby performing processing operations; one or more network or other communications interfaces 304; memory 314; and one or more communication buses 312 for interconnecting these components. The communication buses 312 may include circuitry (sometimes called a chipset) that interconnects and controls communications between system components. In some implementations, a server 300 includes a user interface 306, which may include a display device 308 and one or more input devices 310, such as a keyboard and a mouse.

Figure 4:
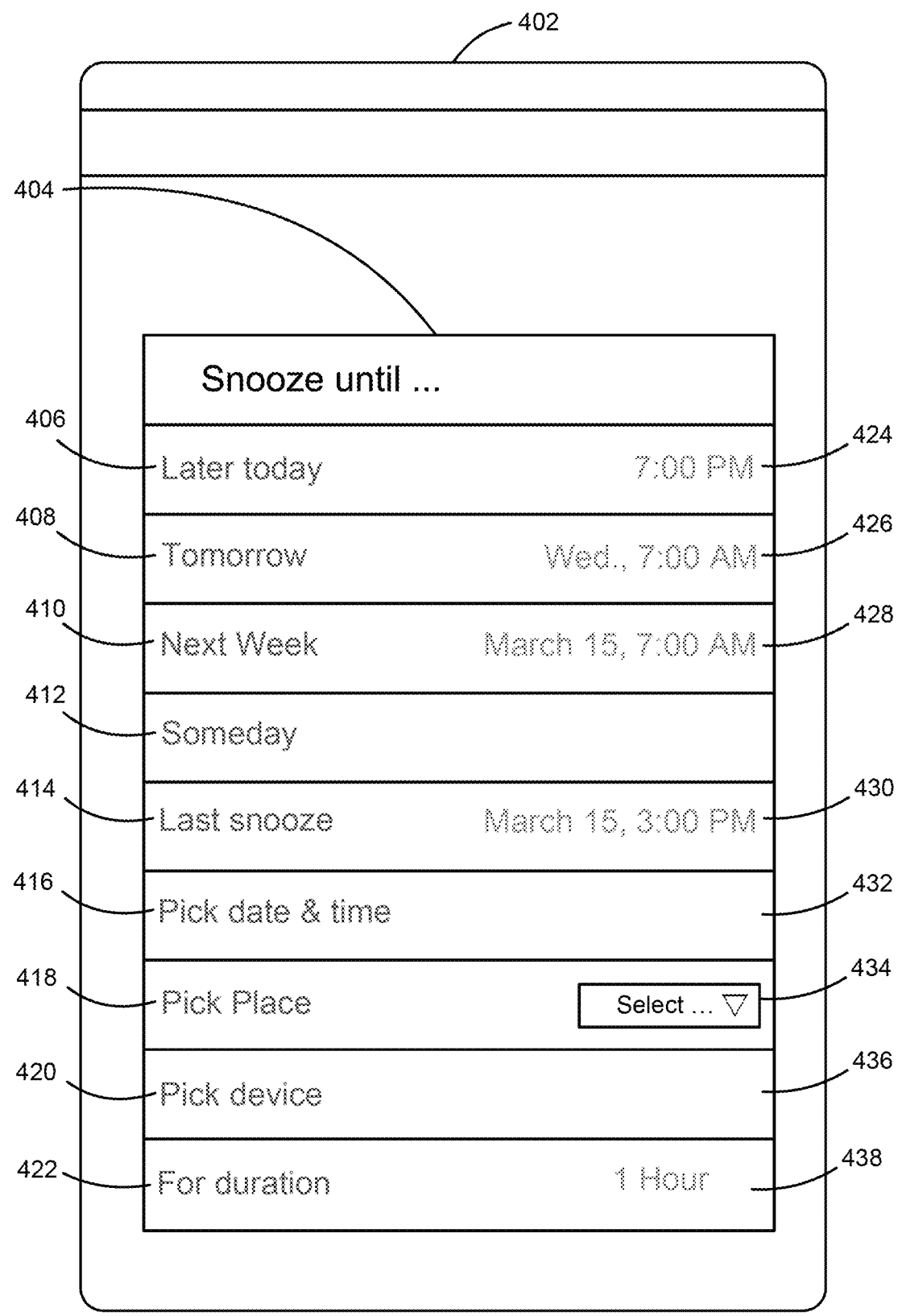
FIG. 4 illustrates a set of message postponement options in accordance with some implementations.
Figure 5:
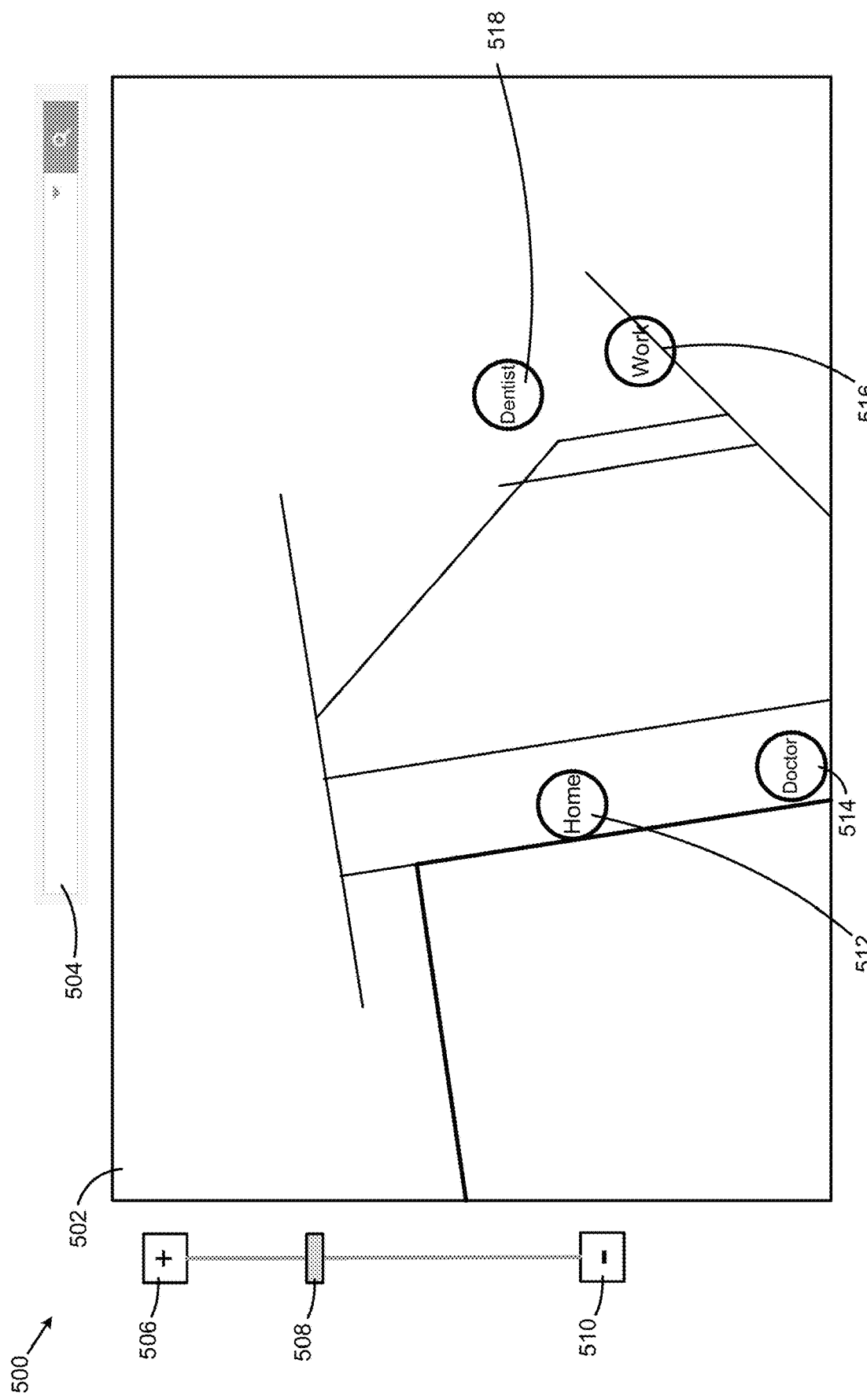
FIG. 5 illustrates a skeletal mapping interface in accordance with some implementations.
Figure 6A:
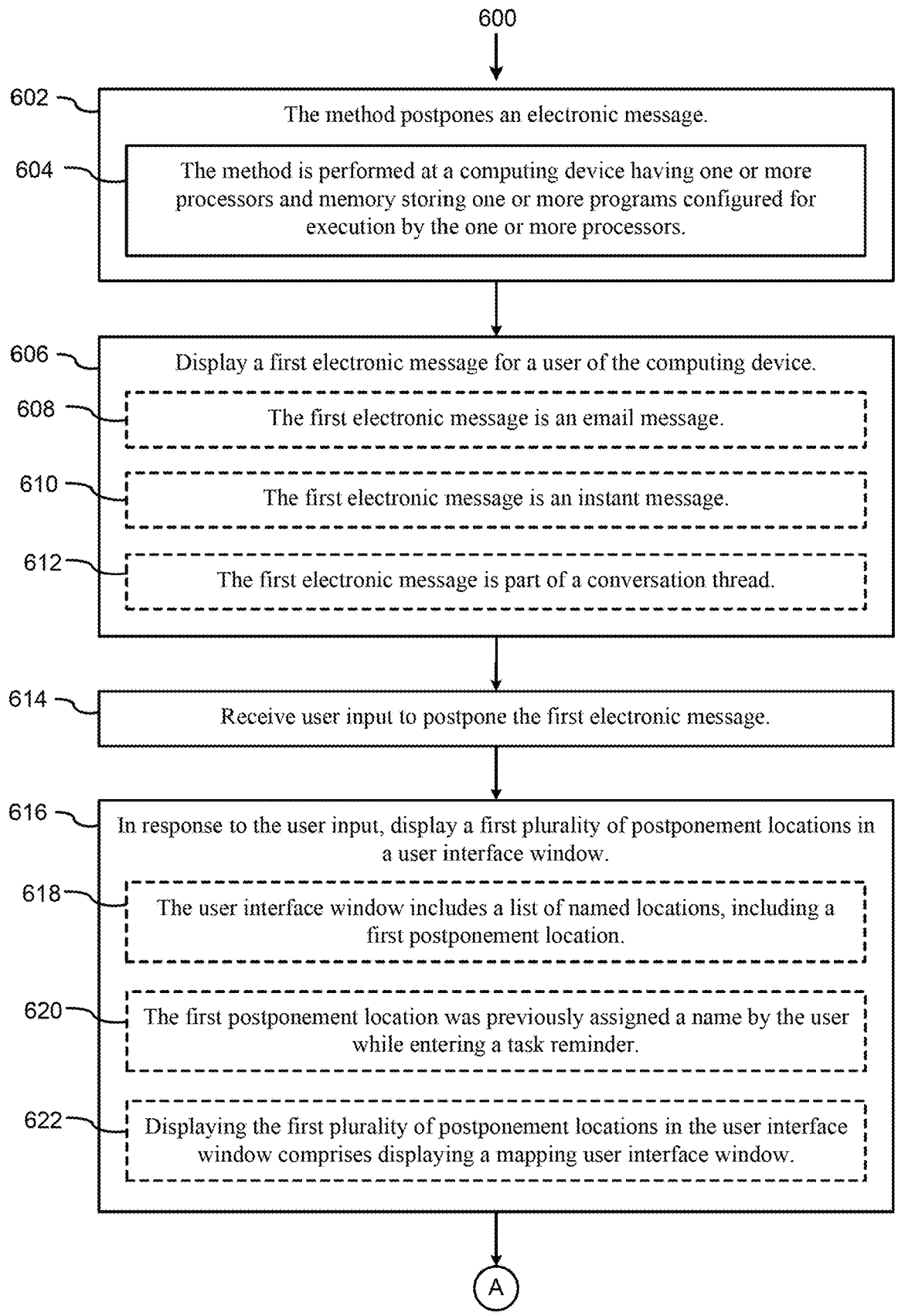
Figure 6B:
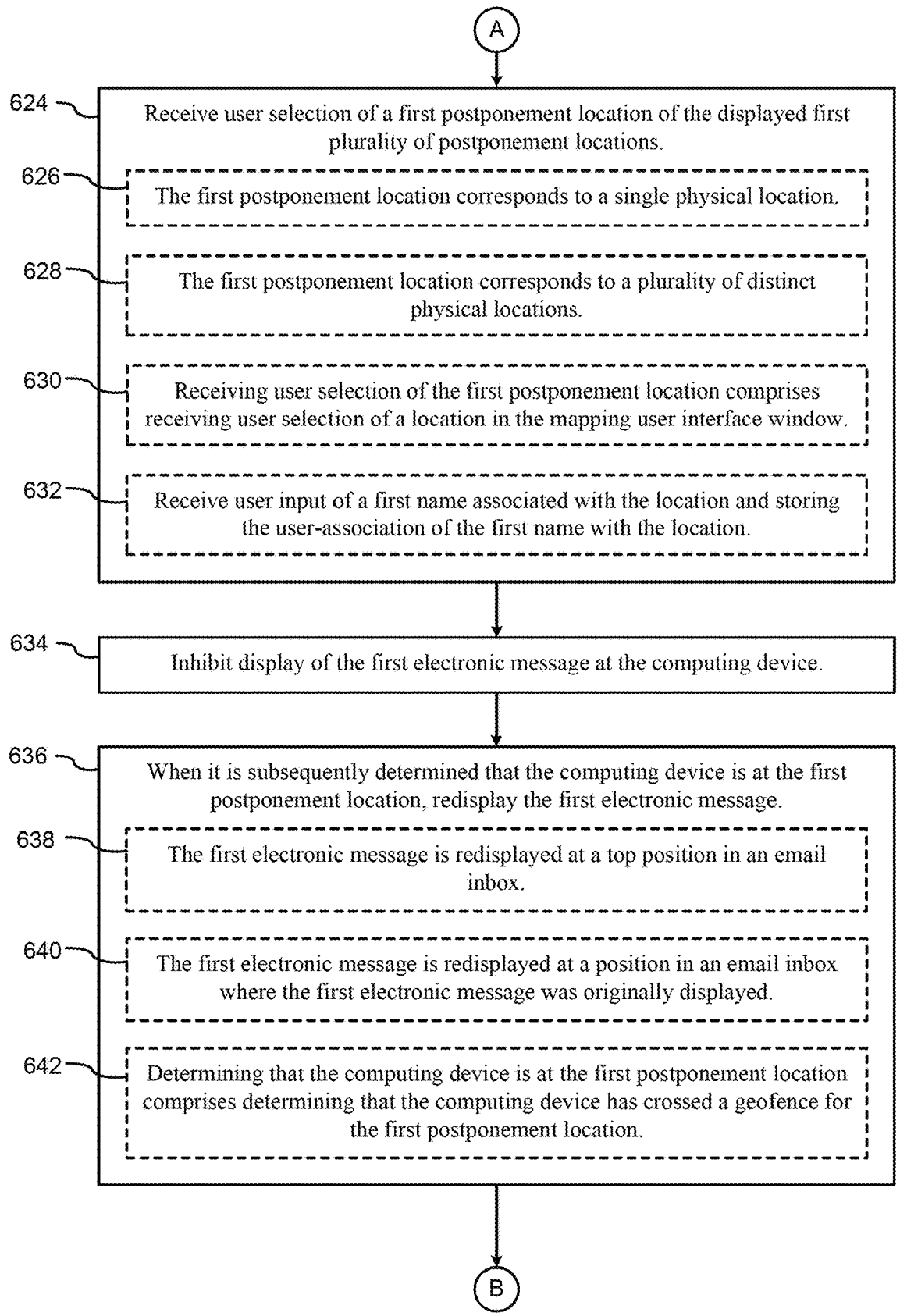
Figure 6C:
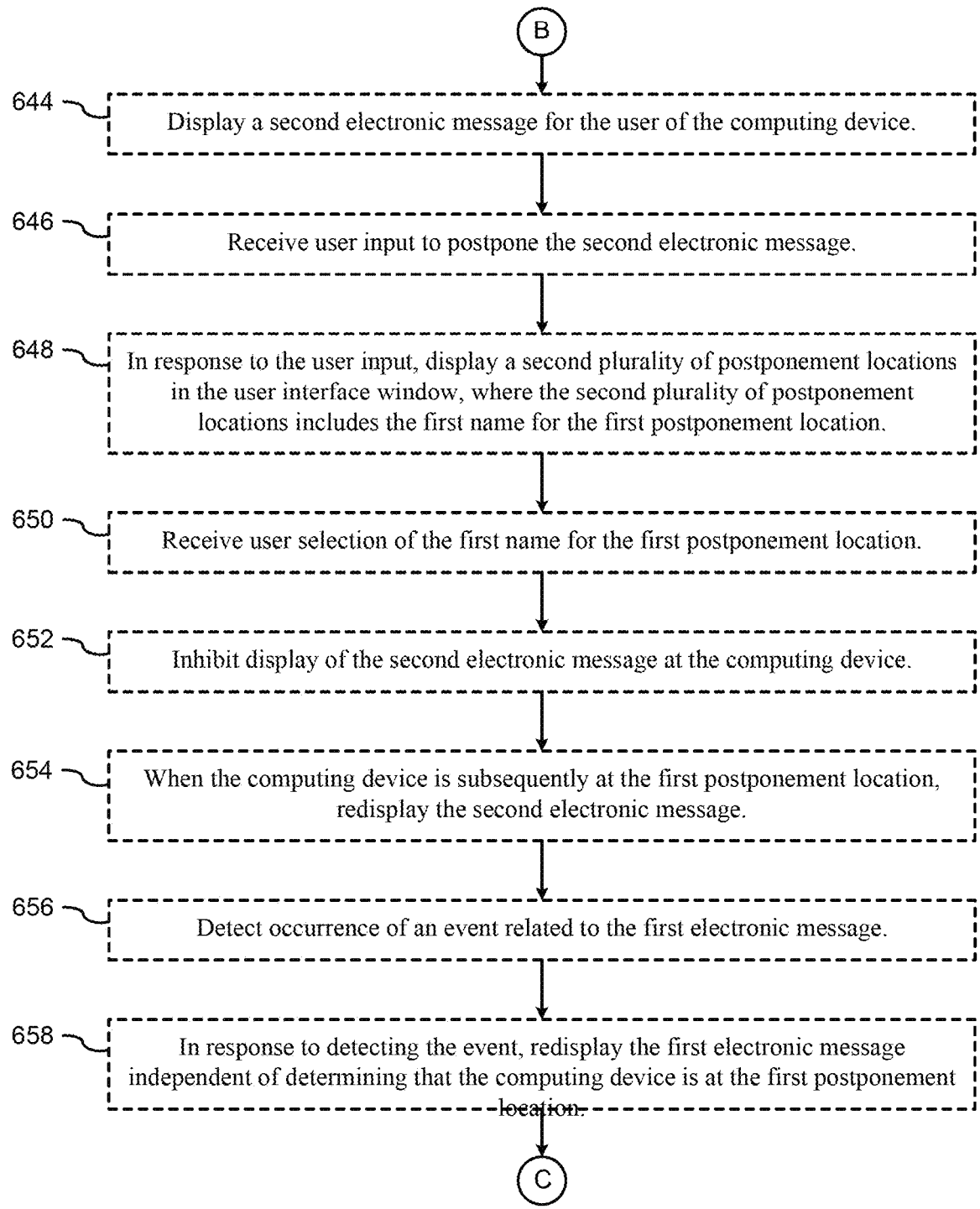

In some implementations, the memory 314 includes high-speed random access memory, such as DRAM, SRAM, DDR RAM or other random access solid state memory devices. In some implementations, the memory 314 includes non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternately the non-volatile memory device(s) within the memory 314, comprises a non-transitory computer readable storage medium. In some implementations, the memory 314, or the computer readable storage medium of the memory 314, stores the following programs, modules, and data structures, or a subset thereof:

an operating system 316, which includes procedures for handling various basic system services and for performing hardware dependent tasks;

a communications module 318, which is used for connecting the server 300 to other computers via the one or more communication network interfaces 304 (wired or wireless), an internal network or bus 122, and communication networks 108, such as the Internet, other wide area networks, local area networks, metropolitan area networks, and so on;

a display module 320, which receives input from one or more input devices 310, and generates user interface elements for display on a display device 308;

one or more web servers 112, which receive requests from a client device 102, and return responsive web pages, resources, or links. In some implementations, each request is logged in the database 116;

one or more application servers 114, which provide various applications (such as an email or other messaging application 106) to the client devices 102. In some implementations, applications are provided as a set of web pages, which are delivered to the client devices 102 and displayed in a web browser 104. The web pages are delivered as needed or requested. In some implementations, an application is delivered to a client device 102 as a download, which is installed and run from the client device 102 outside of a web browser 104. In some implementations, the application server provides a postponement module 222 as part of the messaging application 106. In other implementations, the postponement module 222 is a separate application provided by the application server 114. As illustrated in FIG. 4, the postpone module 222 provides users with a set of postponement options, then acts on the selected option to postpone a received message accordingly. Some implementations provide a mapping module 224, which may be used when a user want to postpone the message until arriving at a specified location. The mapping module 224 may be a separate application or an integrated part of the postponement module 222 or the messaging application 106. The mapping module 224 may display a mapping user interface as illustrated in FIG. 5;

one or more databases 116, which store various data used by the modules or programs identified above. In some implementations, the database 116 includes a list of authorized users 118, which may include user names, encrypted passwords, and other relevant information about each user. The database 116 also stores user specific data 120 that is used by one or more of the applications provided by the application server. For example, some implementations store the electronic messages 228 for each user. In some implementations, the user data 120 includes a postponement log 232, which stores information about each user-selected postponement. In some implementations, the user data 120 includes a set of named locations 234. A location (e.g., an entry in the address list 322) is a named location when the user assigns a name or label to the location. In some implementations, the names of the named locations must be unique. In some implementations, a named location comprises a unique name and a unique identifier of an address in the address list 322 (e.g., a globally unique address ID). Each address in the address list 322 may include a street address and/or a set of geographic coordinates, and may include additional data associated with the address (e.g., whether the address is residential or commercial, what type of business operates there, or a street view image of the address).

Each of the above identified elements in FIG. 3 may be stored in one or more of the previously mentioned memory devices. Each executable program, module, or procedure corresponds to a set of instructions for performing a function described above. The above identified modules or programs (i.e., sets of instructions) need not be implemented as separate software programs, procedures or modules, and thus various subsets of these modules may be combined or otherwise rearranged in various implementations. In some implementations, the memory 314 stores a subset of the modules and data structures identified above. In some implementations, the memory 314 stores additional modules or data structures not described above.

Although FIG. 3 illustrates a server 300, FIG. 3 is intended more as functional illustration of the various features that may be present in a set of one or more servers rather than as a structural schematic of the implementations described herein. In practice, and as recognized by those of ordinary skill in the art, items shown separately could be combined and some items could be separated. The actual number of servers used to implement these features, and how features are allocated among them, will vary from one implementation to another, and may depend in part on the amount of data traffic that the system must handle during peak usage periods as well as during average usage periods.

As illustrated in FIGS. 2 and 3, the functionality for a messaging application may be shared between a client device 102 and a server system 110. In some implementations, after the messaging application is installed on a client device 102, the majority of the subsequent processing occurs on the client device. For example, the postponement log 232 may be stored solely at the client device, and not on a server 300. In other implementations, the majority of the processing and data storage occurs at a server 300, and the client device 102 uses a web browser 104 to view and interact with the data. For example, the mapping module may comprise a set of web pages that are delivered to the client device 102 as needed. One of skill in the art recognizes that various allocations of functionality between the client device 102 and the server system 110 are possible, and some implementations support multiple configurations (e.g., based on user selection).

FIG. 4 illustrates a set of message postponement options in accordance with some implementations. The user interface window 404 of postponement options is displayed when a user of a messaging application 402 chooses to postpone a message. In this example, it is Tuesday, Mar. 15, 2016 at 10:23 AM when the user chooses to postpone a message.

Some implementations include a "later today" option 406, with a specific time 424 pre-populated based on the current time. In some implementations, the default time 424 is also based on prior postponement selections by the user (e.g., if the user has previously postponed messages until 7:00 PM on the same time, that may be a good default value). Implementations typically make the default time 424 editable so that the user can adjust the time. Even if the user adjusts the time, the process has been simplified because the user does not need to specify a date.

Some implementations include a "tomorrow" option 408, with a specific day and time 426 selected by default. Similar to the "later today" option 406, the default day and time 426 may be based on historical selections by the user. In some implementations, the day is fixed (i.e., tomorrow), and only the time is editable. In some implementations, both the day and time are editable.

Some implementations include a "next week" option 410, with a specific day and time 428 pre-populated by default. As with the other options, the default day and time 428 are editable by the user. In some implementations, when the user selects the "next week" option 410, the user interface displays the date (e.g., March 15) rather than the day of the week to avoid ambiguity.

Some implementations provide an indefinite postponement option, which may be labeled "someday" 412 as illustrated in FIG. 4. Unlike the other options, a message that has been postponed indefinitely does not automatically reappear at some designated time. Such a message is postponed until the user specifically chooses to view the postponed messages. In some implementations, the user interface for the messaging application includes a control or menu item (not illustrated in FIG. 4) to display the postponed messages.

Some implementations include a "last snooze" option 414, which allows a user to quickly select the same postponement date and time as most recently selected. In this case, the snooze time 430 is displayed, but is typically not editable. In some implementations, the "last snooze" option uses the very last snooze selection, regardless of how it was selected (e.g., regardless of whether the user selected a specific date and time 416, "later today" 406, etc.). In some implementations, the last snooze option looks only at the most recent selection of a specific date and time 416. In some implementations, the last snooze looks at the "pick place" options 418 and the "pick device" options 420, which are described below. In other implementations, the "pick place" options 418 and "pick device" options 420 are not used when identifying the last snooze.

Some implementations provide a "pick date & time" option 416, which allows a user to specify a date and time after the present time. When this option is selected, the region 432 adjacent to the option typically displays one or more editable controls to specify the specific date and time.

Some implementations provide a "pick place" option 418, which allows a user to designate a place when the message will reappear. Some implementations include predefined and/or user-defined place names, which may be correlated with GPS coordinates or other location identifiers. For example, a user may identify a "home" location, and when the user (e.g., the user's smart phone) reaches home, the message is displayed in the message list. In some implementations, the database 116 at the server system 110 includes a table of predefined locations. The predefined locations may include single independent locations (e.g., the LAX airport), or a set of locations that are grouped together (e.g., a chain of sporting goods stores). Some implementations include a place selector control 434, which may be used to select a named location. In some implementations, the place selector control 434 includes only locations that have been named by the user so that the list is small.

In some implementations, the user may select the "pick place" option 418 (e.g., by tapping or clicking "Pick Place" or a corresponding icon). In some implementations, when the "pick place" option 418 is selected, the mapping module 224 displays a mapping window, such as the example mapping window 500 in FIG. 5. In some implementations, after a location has been selected using a mapping user interface, the name of the location (if the user has defined one) is displayed in the place selector control 434.

Some implementations use a location extracted from the message as a default "Pick Place" option 418. For example, if the message identifies a specific store, mall, park, or other place the user might visit, that is a probable option for postponement.

When a user accesses the messaging application from two or more devices, some implementations will display the postponed message when any one of the devices reaches the designated location (and the messaging application is lamıng). In other implementations, postponing to a specific place considers only the current device that the user is accessing.

Some implementations support an option to postpone a message until the messaging application is being accessed from a specific device. With this "pick device" option 420, the postponed message disappears from the display on the current device, and reappears later when the user accesses the messaging application from the designated device. For example, a user may access an email application from a work computer and from a home computer. If a personal message arrives while at work, the user may wish to postpone the message until after work while looking at email from home. When the "pick device" option 420 is selected, the region 436 adjacent to the "pick device" option 436 includes an editable list of device options (e.g., in a drop-down list).

Some implementations provide a "for duration" option 422, which allows the user to specify the amount of the delay rather than a specific time when the postponement expires. For example, a user may postpone a message by an hour or a day rather than specifying the exact time when the postponement expires. When the "for duration" option 422 is selected, the default postponement duration 438 is editable.

The number of options presented and the order in which the options are presented varies based on the implementation, and may be adapted over time based on user selections. For example, if a user has postponed many messages and never selected the "later today" option 406, the "later today" option 406 may be moved further down in the display or removed from the list of postponement options.

FIG. 5 illustrates a mapping user interface 500, which enables a user to select a location. The message will be postponed (e.g., not displayed in the user's message list or inbox) until the user (e.g., the user's computing device) arrives at the specified location. Some implementations include a map 502, with various annotations. In some implementations, the displayed map 502 is initially based on the user's designated home location. In some implementations, the mapping user interface 500 includes zoom controls 506, 508, and 510. In some implementations, the "zoom in" control 506 may be tapped or clicked in order to increase the magnification for the map. Similarly, the "zoom out" control 510 may be tapped or clicked in order to decrease the magnification for the map. In addition, some implementations include a magnification slider 508, which can be dragged to increase or decrease magnification. The magnification slider displays the magnification level, even when not used for selection.

Some implementations include a text entry area 504, which may be used to enter an address, a business name, or any other information that can be used to identify a location. In some implementations, text that is entered into the text entry area 504 is matched against an address list 322. Some implementations provide completion options or partial completions as a user enters text (e.g., updated after every keystroke). In some implementations, the address list stores common names for some addresses (e.g., "the Ferry Building" in San Francisco), and user entered text in the text entry area 504 is matched against these common names as well. In some implementations, named locations 234 are matched as well, using the user-assigned names.

In some implementations, the named locations 234 created by the user are displayed on the map 502. For example, in FIG. 5, the named locations for the user's home 512, the user's work 516, the user's doctor 514, and the user's dentist 518 are displayed on the map. In some implementations, the named locations 234 are shared by two or more applications (e.g., an email application, a task management application, and an instant messaging application). In this case, a named location created in one of the applications can be used in the other applications.

In some implementations, a user can select a location from the map 502. For example, if the map is sufficiently zoomed in, a user can select a location by tapping or clicking on a position in the map corresponding to the desired physical location. In some implementations, if the tap or click could be ambiguous, the user interface provides a pop up list of addresses near the position selected.

Although postponement has been described mainly with respect to individual messages, the same postponement options can be applied to implementations that group messages together into conversations or clusters. For example, some email applications group all replies with their original message, creating a single conversation or thread. Replies to emails (and replies to those replies) are displayed in one place, in order, making it easier to understand the context of a message.

In some implementations, clusters group together electronic messages having a collective association (e.g., a cluster of promotional material that includes advertisements for retail sales, newsletters from stores, and so on). Message clusters are disclosed further in U.S. patent application Ser. No. 14/145,005, entitled "Systems and Methods for Throttling Display of Electronic Messages," filed Dec. 31, 2013, and U.S. patent application Ser. No. 14/139,205, entitled "Systems and Methods for Clustering Electronic Messages,"

filed Dec. 23, 2013, each of which is hereby incorporated by reference herein in its entirety.

In some implementations, an object in a message list or inbox represents a cluster of messages. A cluster of messages comprises a plurality of messages sharing a common set of characteristics that meet a first predefined criterion (e.g., a clustering criterion based on message content). The plurality of messages may be sent at different times, but cover the same topic and each has the user as a common recipient.

In some implementations, each object in the message list or inbox is one of a task, a message, or a plurality of messages (e.g., a cluster of messages or a conversation). In some implementations, the message list or inbox includes other types of objects as well.

When messages are grouped into conversations or clusters, a snooze selection applies to the conversation or cluster, which is not displayed during the snooze. After the user-selected snooze period, the conversation or cluster reappears in the message list or inbox. In some implementations, at the end of the snooze period, the postponement module 222 inserts a user-invisible "bump" message into the conversation thread or cluster corresponding to the message, which triggers the conversation or cluster to be redisplayed for the user.

FIGS. 6A-6D provide a flowchart of a process 600, performed by a computing device, for postponing (602) an electronic message. The method is performed (604) at a computing device 102 having one or more processors and memory. The memory stores (604) one or more programs configured for execution by the one or more processors.

The process 600 displays (606) a first electronic message for a user of the computing device. Typically the message is displayed in a graphical user interface. In some implementations, the first electronic message is (608) an email message. In some implementations, the first electronic message is (610) an instant message. In some implementations, the first electronic message is (612) part of a conversation thread. In some implementations, all of the messages in a conversation thread are grouped together and presented in the user interface as a group. In some implementations, the first electronic message is part of a cluster.

In some instances, the process receives (614) user input to postpone the first electronic message. In response to the user input, the process 600 displays (616) a first plurality of postponement locations in a user interface window (e.g., using a place selector control 434 illustrated in FIG. 4, or a mapping user interface 500 as illustrated in FIG. 5). In some implementations, the user interface window includes (618) a list of named locations, including a first postponement location, as illustrated in FIGS. 4 and 5. In some implementations, the first postponement location was previously assigned (620) a name by the user while entering a task reminder. As illustrated in FIG. 5, some implementations display (622) the first plurality of postponement locations in a mapping user interface window. For example, as described with respect to FIG. 5, the postponement locations may be displayed graphically on a map 502 rather than in a textual list.

The postponement module 222 (or the mapping module 224) receives (624) user selection of a first postponement location from the displayed first plurality of postponement locations. In some implementations, the first postponement location corresponds to (626) a single physical location. For example, the single physical location may be the user's home or the user's work location. In some implementations, the first postponement location corresponds to (628) a plurality of distinct physical locations. For example, a location may correspond to a retail store that has a hundred different locations. If a user postpones a message to that location, the message will be redisplayed when the computing device is at any one of the stores.

As illustrated above in FIG. 5, in some instances, the postponement module 222 receives (630) user selection of the first postponement location in the mapping user interface window 500. In some instances, when a user selects a location that has not previously been named, the user associates (632) a first name with the location and the mapping module 224 stores the user association of the first name with the location (e.g., in a named locations table 234).

After the user has chosen to postpone the message (e.g., by specifying a postponement location), the messaging application 106 inhibits (634) display of the first electronic message at the computing device.

When it is subsequently determined (636) that the computing device 102 is at the first postponement location, the messaging application 106 redisplays the first electronic message. In some implementations, the first electronic message is redisplayed (638) at a top position in an email inbox. In some implementations, the first electronic message is redisplayed (640) at a position in an email inbox where the first electronic message was originally displayed. In some implementations, determining that the computing device is at the first postponement location comprises (642) determining that the computing device has crossed a geofence for the first postponement location. For example, some locations have a boundary defined by a geofence (e.g., using a set of geographic points to define a polygon). If the coordinates of the computing device are known, the postponement module 222 or the mapping module 224 can determine if the coordinates are inside the polygon. Some implementations use GPS to identify the coordinates of the computing device.

In some implementations, a stored location name used in one postponement can be used in a later postponement. For example, in some implementations, the messaging application 106 displays (644) a second electronic message for the user of the computing device. In some instances, the messaging application 106 (or the postponement module 222) receives (646) user input to postpone the second electronic message. In response to the user input, the postponement module 222 (or the mapping module 224) displays (648) a second plurality of postponement locations in the user interface window. The second plurality of postponement locations includes (648) the first name for the first postponement location (which was saved during the postponement of the first electronic message). The user selects (650) the first name for the first postponement location. The messaging application 106 inhibits (652) display of the second electronic message at the computing device. When the computing device 102 is (654) subsequently at the first postponement location, the messaging application redisplays (654) the second electronic message.

In some implementations, a message that has been postponed to a location can be redisplayed early if certain alternative conditions apply. That is, a postponed message can be redisplayed irrespective of the location of the computing device when specific conditions are met. In some implementations, the specific conditions are determined by the messaging application 106 or the postponement module 222. In some implementations, the user can select and/or construct conditions for when a message is redisplayed early, which may be applied in addition to or instead of the predefined conditions.

For example, in some implementations, the messaging application 106 or the postponement module 222 detects (656) the occurrence of an event related to the first electronic message. For example, a user may receive a message from a friend regarding a concert that is coming soon. The user may postpone the message to home to read more about the concert. However, the messaging application 106 or the postponement module 222 may detect the event that tickets for the concert have just gone on sale (before going home). In response to detecting the event, the messaging application 106 redisplays (658) the first electronic message independent of determining that the computing device is at the first postponement location. In the above example, the message about the concert is redisplayed for the user.

In some implementations, the messaging application includes a task management module or works in conjunction with a task management application. In some implementations, the messaging application 106 detects (660) user entry of a task description that is related to the first electronic message. For example, a user may receive a message to buy certain items at the grocery store, and the user postpones the message to the location for the store. At some point later the user decides to set up a task reminder to go to the grocery store, which is related to the postponed message. In response to detecting the user entry, the messaging application redisplays (662) the first electronic message for the user, independent of determining that the computing device is at the first postponement location.

In some implementations, individual messages are grouped together into conversations or clusters, as described above. A postponement applies to the conversation or cluster rather than to an individual message. When a conversation or cluster is postponed (i.e., the entire conversation or cluster is not displayed during the postponement), it is possible to receive another message corresponding to the same conversation or cluster. In some implementations, the messaging application receives (664) a second electronic message belonging to the conversation thread (or cluster) that has been postponed to a location. In response to receiving the second electronic message, the messaging application 106 redisplays (666) the first electronic message, as part of the conversation thread (or cluster), independent of determining that the computing device is at the first postponement location.

In implementations that group messages together into conversations, a snoozed conversation will reappear in the user's conversation list early if the user receives another message that belongs to the snoozed conversation. For example, suppose a user snoozes a conversation until tomorrow morning at 8:00 AM, but later in the day receives a reply to the conversation from a coworker. The conversation, including the new message, is then displayed in the conversation list at the time the new reply is received. Some implementations apply this to message clusters.

Some implementations support a closely related "mute" feature, which is essentially an uninterruptable snooze. Even if there is a new reply in a conversation, the muted conversation does not reappear on the conversation list until the designated time. Some implementations support a set of mute options that are the same as (or similar to) the snooze options illustrated in FIG. 4. In some implementations, "snooze" and "mute" are implemented together, with a user interface control (e.g., a check box) to indicate whether the postponement can be interrupted by a new reply message to the postponed conversation.

In some implementations, interrupting a snooze or mute based on a new reply received before the end of the postponement period depends on how the new reply is addressed. For example, in some implementations, a "snoozed" conversation is brought back based on any new reply message. On the other hand, a "muted" conversation is brought back for a specific user only when the new reply is addressed to the specific user (e.g., a "TO" recipient rather than a "CC" recipient).

In some implementations, snoozing to a location can be combined with other snooze options (e.g., the options described in FIG. 4). For example, a user may specify multiple conditions that are required to terminate a snooze. As a specific example, snoozing to a location may be combined with snoozing to a device. In some implementations, the user may specify "AND" or "OR" when combining multiple snooze options. For example, a user may specify a snooze to a location, but only after a three hour delay. As another example, a user may snooze to a location, but only if the date or time falls within a certain range (e.g., snooze to a store in a mall, but terminate the snooze only if the user is there on the weekend). In some instances, multiple snooze options are combined with "OR." For example, snooze to a specific location, but if the user has not reached the location in 5 hours, redisplay the message anyway (i.e., snooze to location OR specified duration).

As noted above, a message that has been postponed can be redisplayed early when certain conditions occur. In some implementations, the messaging application 106 provides an API that allows another application to issue a "bump" that moves a snoozed item back into the message list (e.g., inbox) when that application chooses. This allows the other application to use its own triggering logic to decide when specific messages, reminders, message conversations, or message clusters move back into the message list after a user snoozes them. For example, a third party application for event tickets may provide logic that calls the "bump" function in the API to bump a reminder to "buy tickets for <event>" when tickets for <event> go on sale. As another example, some messaging applications 106 have a contextual assistant application that triggers a reminder to "buy a <brand> backpack" when the user walks past a <brand> store. In some implementations, a message is brought back by inserting a user-invisible "bump" message into a conversation thread (or cluster) corresponding to the message, which triggers the conversation (or cluster) to be redisplayed for the user. The bump message may be inserted at the designated snooze time or location, or may be inserted early based on a triggering condition (either from the postponement module 222 itself, or through the API).

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise foil is disclosed. Many modifications and variations are possible in view of the above teachings. The implementations described herein were chosen and described in order to best explain the principles of the invention and its practical applications, to thereby enable others skilled in the art to best utilize the invention and various implementations with various modifications as are suited to the particular use contemplated.

What is claimed is:

1. A method of postponing electronic messages, comprising:
   inserting, by one or more processors of a computing device, an electronic message into a message list so that the electronic message is initially displayable to a user;
   inhibiting, by the one or more processors, display of the electronic message in response to input by the user, the inhibiting removing the electronic message from the message list;
   after inhibiting the display of the electronic message, detecting by the one or more processors, an occurrence of an event related to the electronic message; and
   when the occurrence of the event is detected, reinserting, by the one or more processors, the electronic message into the message list so that the electronic message is redisplayed, wherein the electronic message is part of an electronic messaging application and the event is related to a notification received from another application distinct from the electronic messaging application.

2. The method of claim 1, wherein:
   the inhibiting snoozes the electronic message; and
   receiving the notification from the other application is based on one or more triggering logic criteria of the other application.

3. The method of claim 2, wherein the triggering logic criteria provides a timing to enable the redisplay of the electronic message.

4. The method of claim 2, wherein the notification is associated with a reminder activity.

5. The method of claim 2, wherein the notification is associated with occurrence of a geofencing event.

6. The method of claim 2, further comprising:
   in response to detecting the notification, inserting a user-invisible bump message into a conversation thread in order to trigger redisplaying of the electronic message.

7. A method of postponing electronic messages, comprising:
   inserting, by one or more processors of a computing device, an electronic message into a message list so that the electronic message is initially displayable to a user;
   receiving, by the one or more processors, a user selection of a postponement location having a boundary defined by a set of geographic points;
   inhibiting, by the one or more processors, display of the electronic message by removing the electronic message from the message list;
   after inhibiting the display of the electronic message, determining, by the one or more processors, whether coordinates of a current location of the computing device are inside the boundary defined by the set of geographic points; and
   when the coordinates of the current location of the computing device are determined to be inside the boundary defined by the set of geographic points, reinserting, by the one or more processors, the electronic message into the message list so that the electronic message is redisplayed.

8. The method of claim 7, wherein the electronic message is part of a conversation thread.

9. The method of claim 7, wherein the electronic message is part of an electronic messaging application.

10. A method of postponing electronic messages, comprising:
    displaying, by one or more processors, an electronic message inserted in a message list;
    removing, by one or more processors using a messaging application, the electronic message from the message list for a postponement period during which the electronic message is not displayed, wherein the messaging application provides an application programming interface (API) that allows another application to move the electronic message back into the message list; and
    redisplaying, by the one or more processors, the electronic message when the electronic message is moved back into the message list back in response to input received from the other application.

11. The method of claim 10, wherein the electronic message is part of a conversation thread.

12. The method of claim 10, wherein the electronic message is part of an electronic messaging application.

13. A method of postponing electronic messages, comprising:
    displaying, by one or more processors, an electronic message inserted in a message list;
    removing, by one or more processors, the electronic message from the message list for a postponement period during which the electronic message is not displayed;
    receiving, by the one or more processors from an application, a user-invisible bump message configured to be inserted into a conversation thread in order to trigger redisplaying of the electronic message before the postponement period expires;
    in response to receiving the bump message:
    moving, by the one or more processors, the electronic message back into the message list; and
    redisplaying, by the one or more processors, the electronic message.

14. The method of claim 13, further comprising:
    detecting, by the one or more processors, an occurrence of an event related to the electronic message.

15. The method of claim 14, wherein the event is a news event associated with the electronic message.

16. The method of claim 13, wherein the application has one or more triggering logic criteria that provides a timing to enable the redisplay of the electronic message.

17. A computer-implemented method of postponing electronic messages, comprising:
    establishing a communication interface between a first application and a second application, the first application being associated with a displayable message list;
    the second application using triggering logic to determine a time when an electronic message, previously displayed in the message list of the first application, should be moved back into the message list for redisplay; and
    the second application sending, via the established the communication interface, a notification to the first application to move the electronic message back into the message list for redisplay at the time determined according to the triggering logic of the second application.

18. The computer-implemented method of claim 17, wherein the electronic message has been previously snoozed by a user of the first application, and the notification is a bump function configured to cause the first application to redisplay the previously snoozed electronic message.

19. The computer-implemented method of claim 18, wherein the bump function is configured to cause a reminder to purchase tickets for an event to be displayed in the message list.

20. The computer-implemented method of claim 18, wherein the bump function is configured to cause a location-based notification to be displayed in the message list based on a location of the user.

\* \* \* \* \*